United States Patent [19]
St-Pierre et al.

[11] Patent Number: 5,901,352
[45] Date of Patent: May 4, 1999

[54] SYSTEM FOR CONTROLLING MULTIPLE NETWORKS AND ASSOCIATED SERVICES

[76] Inventors: Sylvain St-Pierre, 1385, Bellevue, St-Lazare, Quebec, Canada, J7T 2L2; Francis Lupien, 4708, Jeanne Mance, Montreal, Quebec, Canada, H2V 4J4

[21] Appl. No.: 08/803,087

[22] Filed: Feb. 20, 1997

[51] Int. Cl.⁶ .................................................... H04Q 7/00
[52] U.S. Cl. ...................... 455/426; 455/433; 455/552; 455/435
[58] Field of Search .................................. 455/432, 433, 455/435, 436, 445, 456, 457, 459, 461, 426, 422, 552, 507, 517

[56] References Cited

U.S. PATENT DOCUMENTS

| | | |
|---|---|---|
| 4,873,517 | 10/1989 | Baratz et al. . |
| 5,239,577 | 8/1993 | Bates et al. . |
| 5,291,477 | 3/1994 | Liew . |
| 5,325,419 | 6/1994 | Connolly et al. . |
| 5,329,578 | 7/1994 | Brennan et al. . |
| 5,337,352 | 8/1994 | Kobayashi et al. . |
| 5,353,331 | 10/1994 | Emery et al. . |
| 5,420,911 | 5/1995 | Dahlin et al. . |
| 5,469,496 | 11/1995 | Emery et al. . |
| 5,475,735 | 12/1995 | Williams et al. . |
| 5,490,139 | 2/1996 | Baker et al. . |
| 5,495,479 | 2/1996 | Galaand et al. . |
| 5,506,887 | 4/1996 | Emery et al. . |
| 5,533,107 | 7/1996 | Irwin et al. . |
| 5,619,552 | 4/1997 | Karppanen et al. ............. 455/433 |
| 5,670,950 | 9/1997 | Otsuka .......................... 455/433 |

FOREIGN PATENT DOCUMENTS

| | | |
|---|---|---|
| 0663784 | 6/1994 | European Pat. Off. . |
| 0 660 627 A2 | 11/1994 | European Pat. Off. . |
| 0738093 | 3/1996 | European Pat. Off. . |
| 0758835 | 8/1996 | European Pat. Off. . |
| 0851702 | 12/1997 | European Pat. Off. . |
| WO 94/10779 | 5/1994 | WIPO . |
| WO 95/10925 | 4/1995 | WIPO . |
| WO 95/23485 | 8/1995 | WIPO . |
| WO 96/06490 | 2/1996 | WIPO . |
| 95-00294 | 3/1996 | WIPO . |
| WO 96/32820 | 10/1996 | WIPO . |

OTHER PUBLICATIONS

PCT International Search Report, Oct. 28, 1998, PCT/SE 98/00213.

*Primary Examiner*—Doris H. To
*Attorney, Agent, or Firm*—Jenkens & Gilchrist

[57] ABSTRACT

A system for enabling network convergence and interworking between multiple communications networks is disclosed. A subscriber is associated with a plurality of communications networks each utilizing its own schemes, protocols, and standards for effectuating communication therein. A main centralized database storing subscription, network, service, and location data associated with each of the communications networks is provided. A main administrative node for defining and providing new subscription, subscriber preference, and parameters is further provided. The main centralized database and the administrative node then communicate with corresponding functions within each of the communications networks to provide centralized information sharing, data control, and network resource management across the plurality of associated communications networks.

21 Claims, 8 Drawing Sheets

SYSTEM FOR CONTROLLING MULTIPLE NETWORKS AND ASSOCIATED SERVICES

BACKGROUND OF THE INVENTION

1. Technical Field of the Invention

The present invention relates to a communications network and, in particular, to the management of multiple services within multiple communications networks.

2. Description of Related Art

With the development of different types of telecommunications and data communications, a number of different services and features are available to users. For example, a Mobile Station Integrated Service Digital Service (MSISDN) number, Mobile Identification Number (MIN), or International Mobile Subscriber Identity (IMSI) number may be assigned to a particular mobile telecommunications user enabling the mobile user to utilize mobile service within a mobile telecommunications network. An Internet Protocol (IP) address may be assigned to a particular node or device to receive and to transmit Transmission Control Protocol/Internet Protocol (TCP/IP) packets over the associated TCP/IP network such as the Internet. Furthermore, Asynchronous Transfer Mode (ATM) addresses are utilized to communicate packet data between two associated nodes within an ATM network. Another type of communications network is a Cellular Digital Packet Data (CDPD) network which is a cellular radio network specification that allows CDPD users to send computer data over existing cellular networks. With the help of Interworking Functions (IWF) and other communications devices, a mobile station or terminal is capable of communicating over different communications networks. As an illustration, a mobile subscriber can communicate voice, data, fax, e-mail, etc., over different types of networks.

In order to access and utilize different networks, a user or subscriber needs to maintain a separate subscription, account, and/or address for effectuating communication within the respective communications network. Each of these communications networks is therefore individually maintained and operated. However, due to different communications protocols and network architectures, no common interface exists between different communications networks. Consequently, any changes or updates in data associated with a particular subscriber within one communications network need to be manually and/or separately updated within another applicable communications network. Moreover, there is no seamless inter-networking functionality between different communications networks.

As an illustration, a mobile equipment or station is assigned with a mobile identification number and an IP address. As described above, the MSISDN, MIN, or IMSI number may be associated within a mobile telecommunications network, and the IP address may be associated with the CDPD, Internet, or other data network. Because of its ability to associate with any given mobile telecommunications node, the mobile station is capable of traveling within a particular geographic area and being served by different mobile switching centers (MSCs). As the mobile station travels from a first MSC coverage area to a second MSC coverage area, the mobile station, the serving MSC, and associated visitor location register (VLR) perform a location update to inform a centralized database known as a home location register (HLR) of the mobile station's current location. Such location information is then utilized by the mobile telecommunications network to route an incoming call connection to the MSC/VLR currently serving the called party mobile station. However, even though the mobile telecommunications network is updated with the latest location information, in order to further receive data over the cellular network, a similar location update needs to be performed within the CDPD network. Such redundant location or subscriber data updates within multiple communications networks are rather inefficient and inconvenient. Furthermore, since compatibility and interface are not currently feasible between different types of communications networks, a first communications network is not able to utilize information available within a second communications network. Moreover, in order for a subscriber or user (e.g., mobile user, operator, system administrator, network controller, etc.,) to review or to ascertain subscription or service data associated with a plurality of communications networks, the user needs to individually evaluate the relevant data associated with each communications network. In summary, there is no global scheme for enabling a subscriber or user to review all of the communications networks and subscription data associated thereto.

Accordingly, there is a need for a mechanism to enable a subscriber or user to consolidate and manage multiple networks and associated services in a more efficient and centralized manner.

SUMMARY OF THE INVENTION

A communications system for maintaining and managing subscription, service, and network data over a plurality of communications networks is disclosed. A plurality of communications networks, each utilizing its own protocols and standards for effectuating mobility management and data communications, are available. A main database stores data correlating network addresses, subscription data, and location and registration data representing a particular subscriber and associated with the plurality of different communications networks. A main administrative node is further connected to each of the communications networks for defining and providing subscription data representing a subscriber and for communicating such data with each of the associated communications networks.

As an alternative, each communications network may define and provide its own subscription data representing the subscriber and then communicate such data to the main administration node and the centralized database accordingly.

A main resource management module is further connected to the associated communications networks to allocate and manage shared network resources amongst the associated communications networks.

A service control function module is also associated with the main administrative node for effectuating an interface between a first service within a first communications network and a second service within a second communications network.

As a further embodiment of the present invention, the main database is comprised of three sub-databases: a subscriber address sub-database for storing and correlating different network addresses associated with a particular subscriber; a subscriber profile sub-database for storing and providing service authentication/authorization, and service preferences; and a location and registration sub-database for maintaining and providing the current location and registration status of a particular subscriber within each of the associated communications networks.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
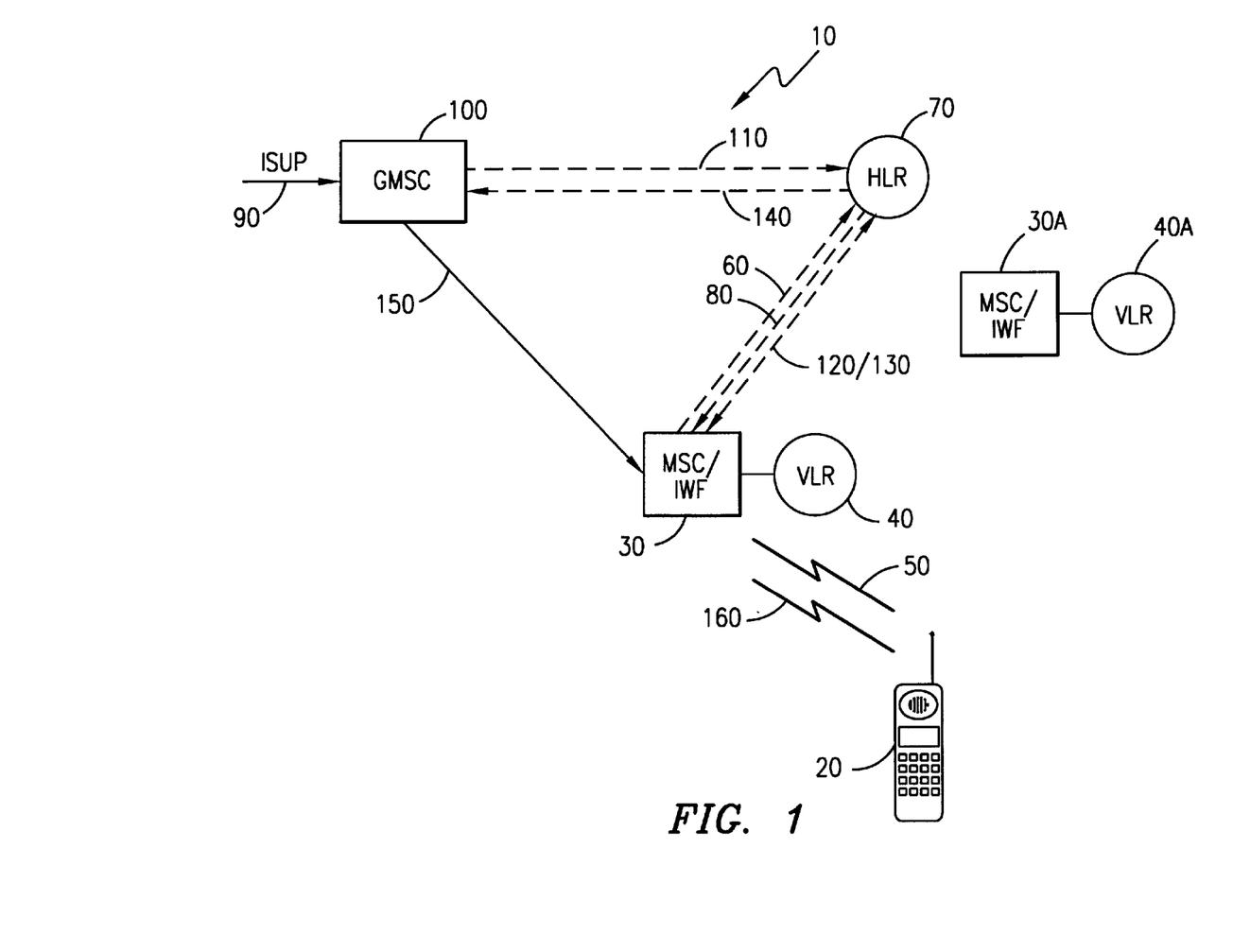
FIG. 1 is a block diagram of a cellular telecommunications network illustrating the establishment of an incoming call connection towards a traveling mobile station.

FIG. 1 is a block diagram of a cellular telecommunications network 10, such as a Public Land Mobile Network (PLMN), illustrating the establishment of an incoming call connection towards a traveling mobile station 20. By way of radio interface, the mobile station 20 is able to travel into any geographic area and be served by an associated mobile telecommunications node. As an illustration, the mobile station 20 travels into a geographic area being served by a mobile switching center (MSC) 30 and a visitor location register (VLR) 40. Such an MSC 30 may further be equipped with interworking functions (IWF) for providing communication over different protocols. The MSC 30 and VLR 40 are often co-located with each other and are hereinafter collectively referred to as an MSC/VLR 30/40. When the mobile station 20 realizes that it is within a geographic area being served by a new MSC/VLR 30/40, the mobile station 20 initiates a registration process by transmitting its identification number 50, such as an International Mobile Subscriber Identity (IMSI) number, or Mobile Identification Number (MIN). The serving MSC/VLR 30/40 then transmits a location update signal 60 to a home location register (HLR) 70 associated with the received identification number 50. The HLR 70 is a centralized database for storing subscription data and other necessary network data associated with the mobile station 20 (or mobile subscriber associated with the mobile station 20). The associated HLR 70 further maintains data representative of the current location of the mobile station 20. As a result, the location update signal 60 transmitted by the serving MSC/VLR 30/40 informs the HLR 70 of the current location of the mobile station 20 and requests necessary subscription data from the HLR 70. The HLR 70, in turn, authenticates the mobile station represented by the received identification number and returns the requested subscription data to the serving MSC/VLR 30/40 via yet another signal 80.

Thereafter, an incoming call connection is requested towards the mobile station 20. As an illustration, another telecommunications subscriber dials a Mobile Subscriber Integrated Service Digital Network (MSISDN) number or Mobile Identification Number (MIN) number identifying the mobile station 20. A call setup signal, such as an Integrated Service Digital Network User Part (ISUP) based signal 90 is transmitted by an originating end office and routed to a gateway mobile switching center (GMSC) 100 associated with the HLR 70. In order to ascertain the current location of the called party mobile station 20, the GMSC 100 then performs an HLR interrogation by transmitting a connectionless signal 110, such as a Mobile Application Part (MAP) or IS-41 based signal, to the HLR 70. The transmitted MAP or IS-41 based signal requests routing instructions toward the called party mobile station 20. Utilizing the location information previously updated by the serving MSC/VLR 30/40, the HLR 70 then transmits another MAP or IS-41 based signal 120 to the serving MSC/VLR 30/40. The serving MSC/VLR 30/40 then provides a roaming number 130 or temporarily location directory number (TLDN) representing the serving MSC/VLR 30/40 back to the HLR 70. The received roaming number or TLDN, for example, is then provided back to the requesting GMSC 100 via yet another MAP based signal 140. The GMSC 100 then reroutes the received incoming call setup signal to the serving MSC/VLR 30/40 by utilizing the received number as the new destination address. A new call connection 150 is established between the serving GMSC 100 and the serving MSC/VLR 30/40. The serving MSC/VLR 30/40 pages the mobile station within its service area, and effectuates a radio communication 160 with the responding mobile station 20. As a result, regardless of which telecommunications node is currently serving the mobile station 20, the serving PLMN keeps track of the mobile station's current location and registration status and automatically effectuates a call connection therewith. Such a scheme for updating the location information and effectuating an incoming call connection toward a mobile station is hereinafter referred to as mobility management (MM) and a traffic control and routing (TCR) scheme, respectively.

An access to the PLMN requires mobility management based on its own network dependent views and protocols. For example, IS-41 and associated MAP based signaling are required to keep track of the mobile station's current location and to reroute an incoming call to an appropriate telecommunications node currently serving the called party mobile station. Furthermore, the PLMN has its own scheme for identifying the mobile station, such as via an IMSI, MIN, or MSISDN number. The PLMN further has its own way of paging a mobile station, allocating necessary communication or radio channels, and establishing a radio interface with the called party mobile station. Telecommunications nodes, devices, and platforms for effectuating such mobile service are also PLMN dependent and specific. The database and access schemes for storing subscription data associated with a particular subscriber are further PLMN defined.

Various communications networks are available to communicate data, other than mere voice, with mobile stations. Such networks include, but are not limited to, Integrated Service Digital Network (ISDN), Asynchronous Transfer Mode (ATM) network, Internet Protocol (IP) network with mobility adaptation, and Cellular Digital Packet Data (CDPD) network. Each of these networks has its own mobility management scheme, subscription management scheme, traffic control schemes, and other necessary functionality, protocols, and standards for effectuating communication. For instance, a scheme for maintaining subscriber location and activity data relies on network specific reference models and concepts. It is further managed through dedicated nodes and data bases with network specific and defined routing tables or location registers.

As an illustration, following an Internet Engineering Task Force (IETF) definition, the Internet Protocol (IP) implements mobility through "home agents", "care of address", and "visiting agents" concepts to route IP packets to the appropriate subscriber location. It also has a separate updating procedure and scheme for updating routing tables for effectuating mobility management thereto.

As another illustration, a CDPD network similarly has its own mechanism for locating subscribers within the CDPD radio network. A "channel stream" data identifies a Mobile Database Station (MDBS) currently serving a CDPD mobile terminal. The channel stream identification data associated with the CDPD mobile terminal located within a particular area is then maintained as location information in the CDPD's Mobile Visiting Function (MVF) through the CDPD's Radio Resource Management Protocol (RRMP) and Mobile Network Registration Protocol (MNRP). The "visiting" Mobile Data-Intermediate System (MS-IS) address is further maintained in the CDPD's Mobile Home Function (MHF) through a Mobile Network Location Protocol (MNLP).

Figure 2:
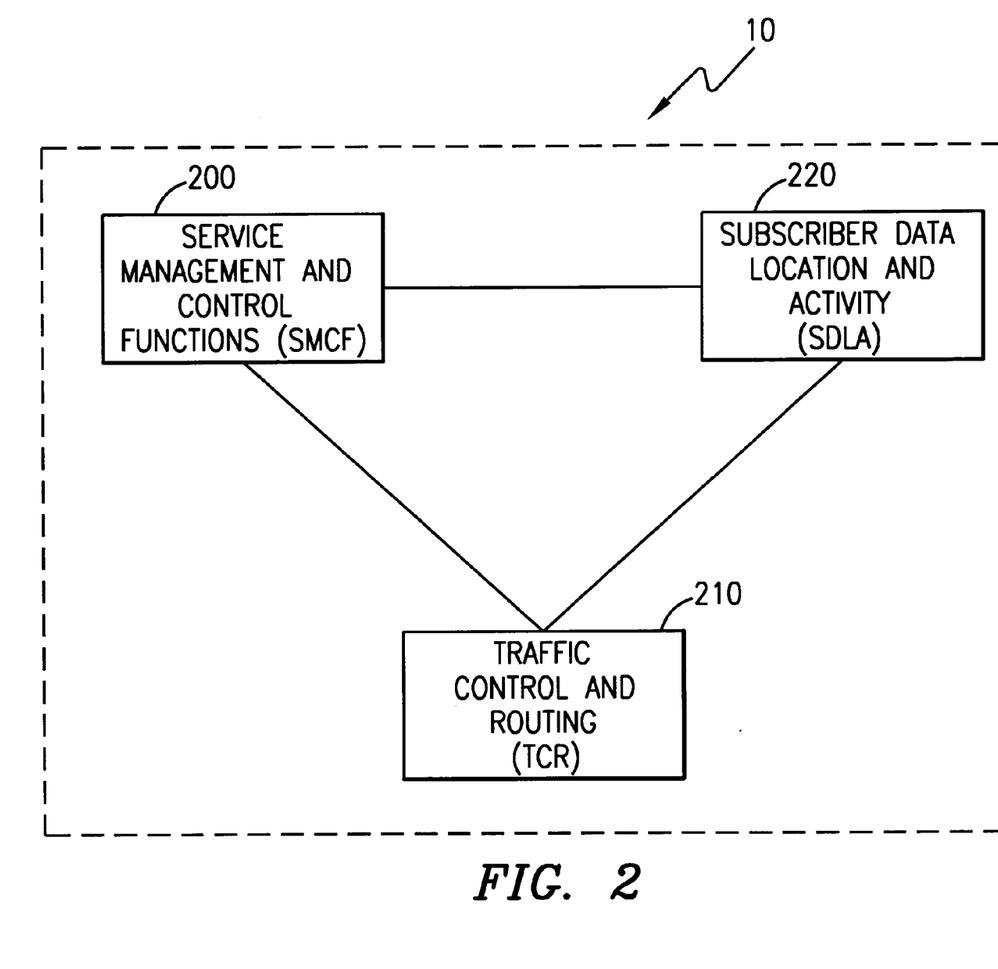
FIG. 2 is a diagram illustrating the different logical functions within a communications network.

FIG. 2 is a diagram illustrating the different logical functions within a typical communications network. Within any given communications system 10 serving a terminal, equipment, or device that is able to relocate from a first geographic area to a second geographic area, the functions for effectuating communication within such a network are divided into three basic logical functions. There is a service management and control function (SMCF) 200 for maintaining subscription data associated with its users. Such subscription data include a network address representing a particular user, service data, subscriber application feature data, and other necessary network data for effectuating communication with the user. A home location register (HLR) and subscription data stored thereto within a PLMN are analogous to the SMCF 200. The "intelligence" or control for information delivering and handling is further concentrated in the SMCF 200. For example, the SMCF 200 determines the parameters to be applied for an applicable routing mechanism in order to perform the optimal choice of routing associated with a particular data delivery.

A subscriber data, location and activity (SDLA) function 220 maintains the current location and registration status of a particular subscriber within the communications network 10. The SDLA function 220 therefore keeps track of the mobile station's current location and registration status as the mobile station travels from one MSC/VLR coverage area into another MSC/VLR coverage. Similarly, the HLR, serving MSC/VLR, and MAP or IS-41 based signaling communicated therebetween within a PLMN are analogous to the logical SDLA function.

Lastly, a traffic control and routing (TCR) function 210 performs the function of receiving, routing, and effectuating a radio-interface with a called party subscriber or device. Accordingly, the TCR function 210 handles the actual routing algorithms or mechanisms required within the network, either for connection oriented routing (e.g., a fixed or virtual circuit connection) or for connection-less routing (e.g., IP). The TCR function 210 therefore controls the interaction of the different layers of network communications protocols and required Interworking Functions (IWFs). It functions as a relay between communications networks through which the routing is performed. Within a cellular telecommunications network, the GMSC-HLR route requests, HLR-MSC/VLR location request, and establishment of a call connection are analogous to the TCR function 210.

As a result, the data representing a subscriber or user are stored and maintained, the current location of a particular user or device is updated, and a physical establishment of communication with a called party user or device is effectuated through the above three functions.

It is to be understood the most basic three functions are illustrated above for exemplary purposes. Each network further includes a number of other functions, modules, resources, and support applications for enabling communication within such a network.

Figure 3:
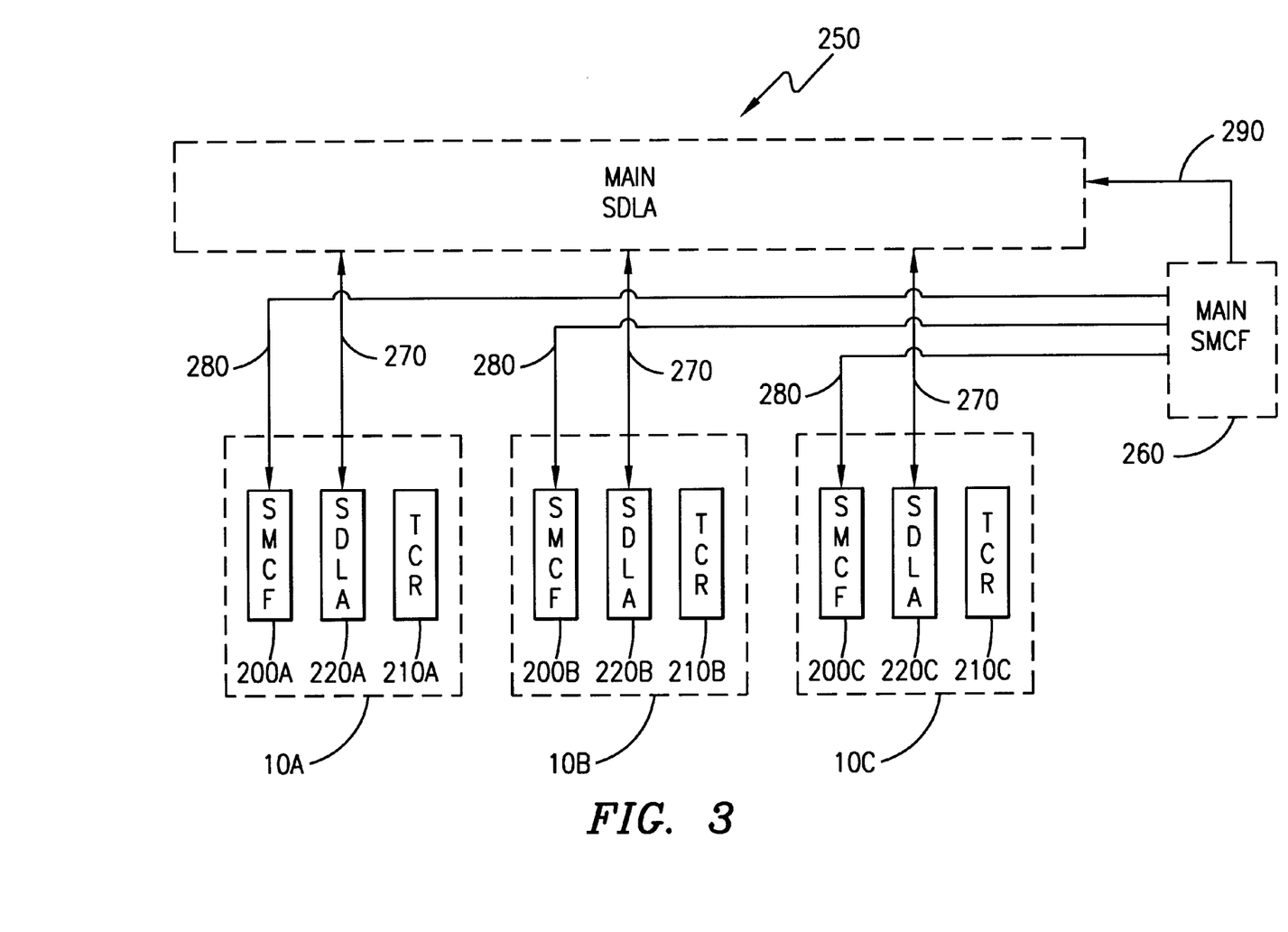
FIG. 3 is a diagram illustrating the interfaces that exist between communications networks, a main centralized database, and an administrative node in accordance with the teachings of the present invention.

FIG. 3 is a diagram illustrating the interfaces that exist between each communications network 10A–10C, a main centralized database 250, and an administrative logical node 260 in accordance with the teachings of the present invention. As described above, each communications network 10A–10C utilizes its own schemes for mobility management, addressing associated users or devices, defining and maintaining subscription data, etc. In accordance with the teachings of the present invention, a centralized database 250 developed and maintained independently of the associated communications network is introduced. The centralized database 250 stores subscription data, location data, registration status data, network address data, and any other necessary network data in a more generic and user friendly manner without being dependent on any one particular communications network 10 or associated protocols. As a result, the centralized database 250, also known as a main SDLA, maintains and provides a consolidated view of all necessary network data associated with a plurality of communications network serving a particular user or device. Accordingly, instead of the user individually and separately evaluating data stored within local SMCFs 200A–200C or SDLAs 220A–220C, the user is able to gain a consolidated or centralized view of all relevant subscription accounts, network addresses, directory numbers, and location information associated within a plurality of communications networks. The main SDLA 250 is then interfaced with each local database or SDLA 220A–220C within each communications network 10A–10C via signal interfaces 270.

As a further embodiment of the present invention, a centralized administrative node, known as a main Service Management and Control Functions (SMCF) 260, is further provided. The main SMCF 260 provides a network independent profile representing a particular subscriber or account. The network independent data introduced by the main SMCF 260 are then communicated down to each relevant local SMCF 200A–200C via interfaces 280. Accordingly, instead of a user individually and separately creating a subscription with each of the relevant communications networks, the user is able to instead communicate with the centralized administrative node 260 to subscribe and to provide necessary data in a more focused manner.

Alternatively, the user may individually and separately create a subscription with each of the relevant communications networks. Each communications network then communicates with the centralized administrative node 260 and/or the database 250 to consolidate or to correlate the relevant data.

Accordingly, with the introduction of the main SDLA 250 and the main SMCF 260, the incompatibility currently existing between different types of communications systems is resolved. While maintaining and respecting the functional integrity of each network, a consistent definition of the basic concepts and associated data within each network is provided with the introduction of the centralized database. Individual network and associated SDLA 220 and SMCF 200 can then view and interpret the data provided by the main SDLA 250 and the SMCF 260 with its own perspective and definition. Furthermore, by defining a system for mobile telephony and mobile data communications independent of the underlying physical networks, the system is able to support cross network mobility, support cross network service definition, share resource management, and provide seamless service control and intelligent routing between different "physical" networks. Accordingly, transparent inter-networking is created between different networks such as ISDN, ATM, IP, or the like.

Figure 4:
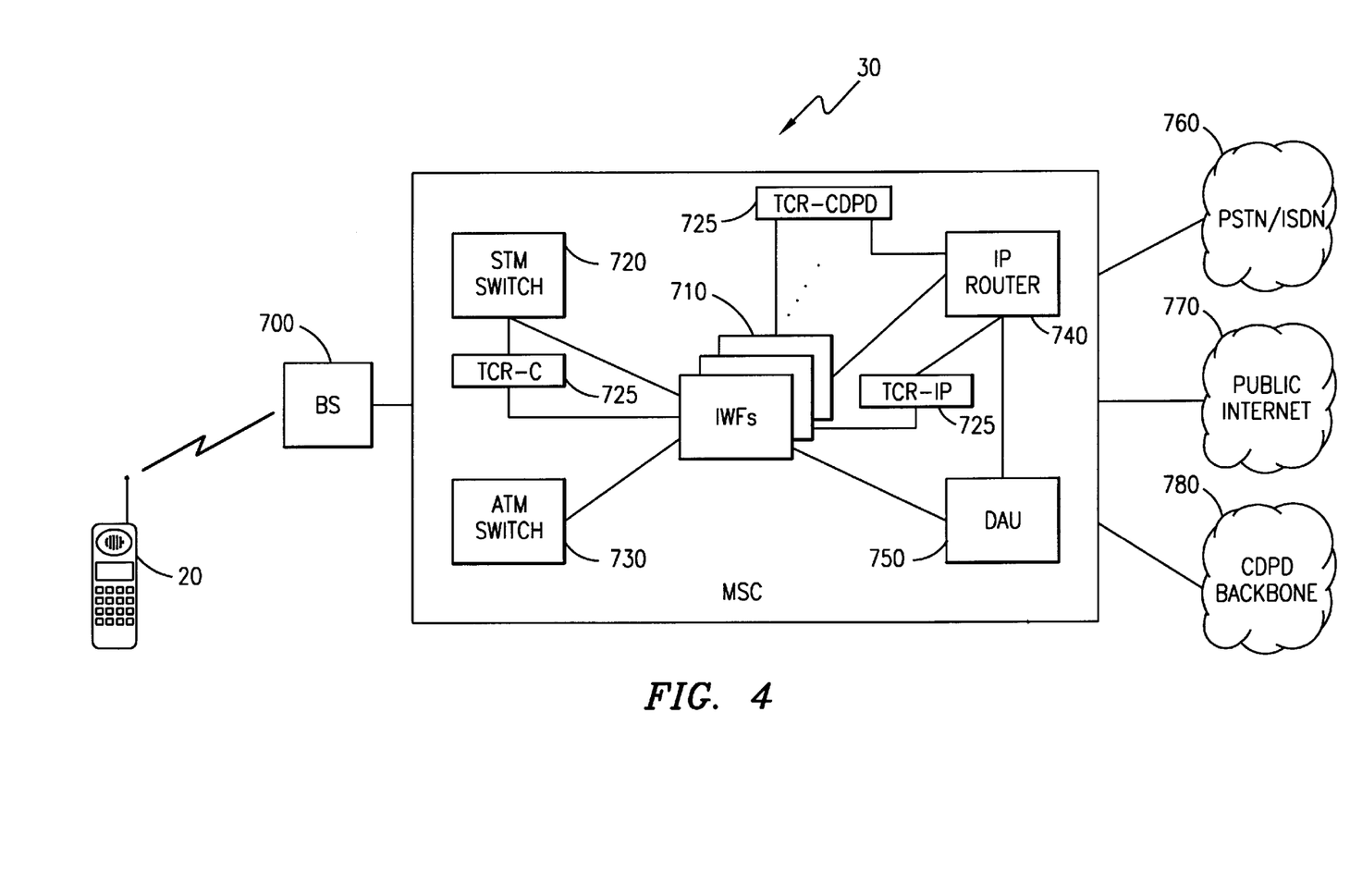
FIG. 4 is a block diagram illustrating a physical representation of a logical Traffic Control Function within a communications network.

FIG. 4 is a block diagram illustrating a physical representation of a logical Traffic Control and Routing (TCR) Function within a communications network. Each communications network controls and handles its own TCR logical function as described in FIG. 3. Physical implementation and configuration of such TCRs within each communications network may however be co-located within a single platform or environment. A serving MSC 30 serving a particular mobile station 20 via a base station (BS) 700 may include an Internet Protocol (IP) router 740 for routing IP packets. It may further include a switching narrowband (STM) platform 720 for delivering narrowband data. It may further include a wideband platform 730, such as an Asynchronous Transfer Mode (ATM) platform, for routing wideband data. The serving MSC 30 may further include a Direct Access Unit (DAU) 750. Different data delivery and routing platforms existing within a single MSC are then interfaced using an Interworking Function (IWF) 710. A traffic control and routing controller (TCR-C), such as an TCR-C, TCR-CDPD, and TCR-IP 725, may then provide the necessary support, platform, and logic to control the associated STM switch 720, ATM switch 730, IP router 750, and the DAU 750. After data are adapted or transformed to communicate over a particular network, the serving MSC 30 connects with other available networks, such as a PSTN/ISDN 760, public Internet 770, and CDPD backbone 780 networks.

Figure 5:
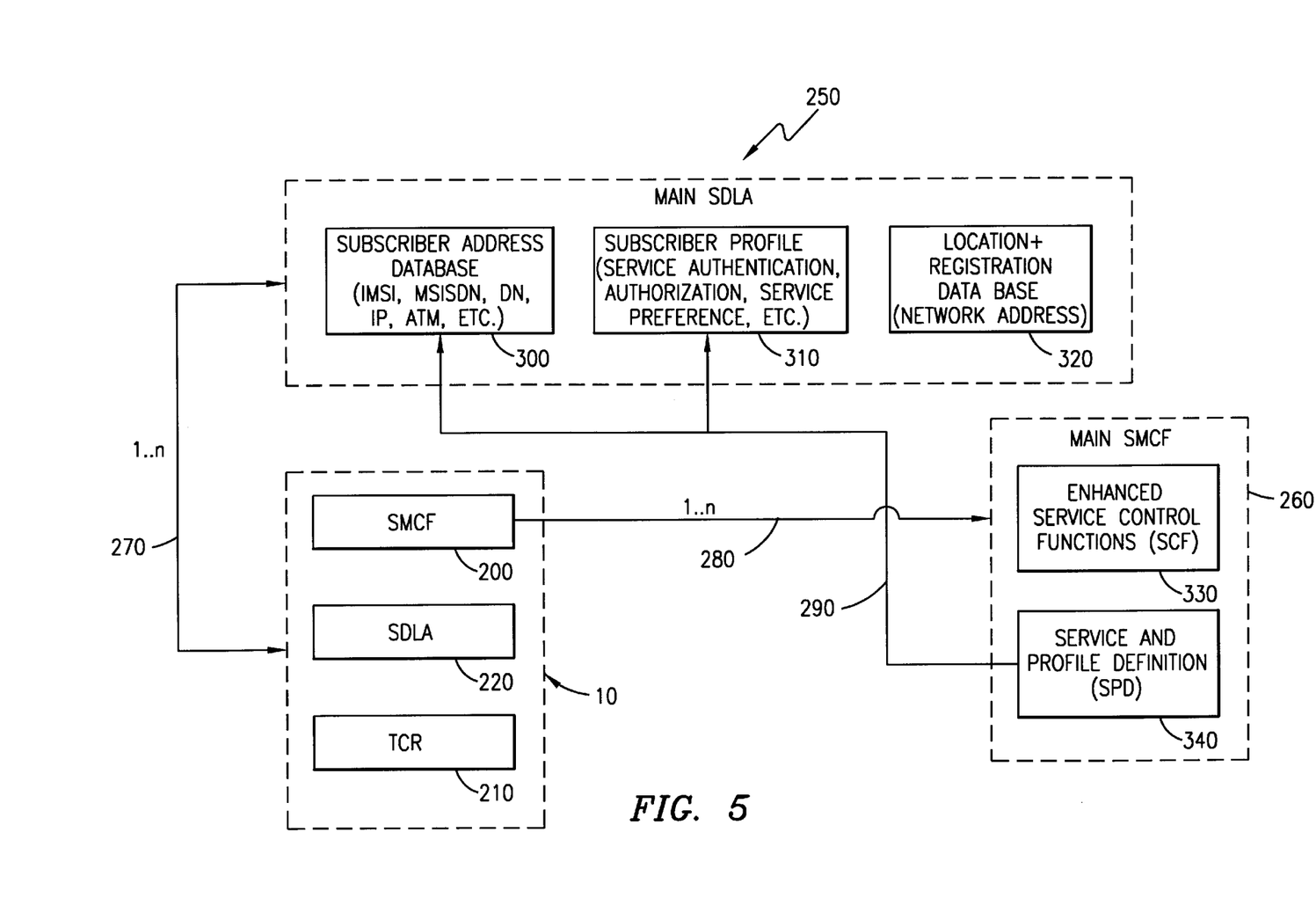
FIG. 5 is a diagram logically illustrating sub-databases within the main centralized database, and sub-functions within the main administrative node.

Reference is now made to FIG. 5 logically illustrating sub-databases within the main centralized database (SDLA) 250, and sub-functions within the main administrative node (SMCF) 260. The main SDLA database 250 is comprised of three logical sub-functions or sub-databases. A subscriber address sub-database 300 within the main SDLA database 250 stores a plurality of network addresses each representing a particular user or device within each of the associated communications networks. A user may have a different subscription with a Public Switched Telephone Network (PSTN), PLMN, ATM network, TCP/IP network, and CDPD network. As a result, the user may be represented by five different network addresses: wireline directory number (E.164 directory number—DN), mobile identification number (i.e., MSISDN, IMSI, or MIN), ATM address, IP address, and CDPD address, respectively. As mentioned above, each network knows and cares only about its own respective address. In order to centralize and to consolidate the different network addresses associated with a given subscriber, the subscriber address sub-database 300 stores and correlates the associated different network addresses. If a first communications network is able to identify a particular user using a first network address, a corresponding second network address for a second communications network may therefore be ascertainable.

A subscriber profile function or sub-database 310 stores and maintains subscriber profile data associated with each user or device. A set of subscriber authorized services, and their service definitions and parameters are maintained by the subscriber profile sub-database 310. Such parameters may include the type of services, bandwidth requirements, bit error rate requirements, delay requirements, burstiness, and duplex bandwidth utilization (symmetrical or asymmetrical) requirements. The subscriber profile sub-database 310 further stores subscriber preference data. Such preference data include a cost of routing (the cheapest method to deliver services based on above definition of services) routing strategy, choice of bearer(s) for routing and delivering data, choice of applications for originating and receiving data, and redirection data based on the activation/deactivation status of various subscriber services and preference.

The main SDLA 250 further comprises a location and registration sub-database 320 for storing and maintaining the current location of a user or device within each of the associated communications networks. Therefore, the location registration sub-database 320 determines where and in which network the subscriber is currently registered and active. As an illustration, each time a mobile subscriber enters a new MSC/VLR coverage area (refer to FIG. 1), the serving MSC/VLR performs a location update with an associated HLR to inform the HLR of the mobile station's current location. The HLR, which performs the logical function of the SDLA 220, then communicates such location and registration information to the centralized database SDLA 250 via the interface 270. The location and registration sub-database or sub-function 320 then stores the data and enables other communications network to access the data and to utilize the stored information.

Referring back to FIG. 4, the serving MSC 30 may be associated with a plurality of network addresses. As an illustration, the serving MSC may be assigned with a roaming number or TLDN for a cellular network. The same serving MSC 30 may further be associated with an IP address for its IP router. The serving MSC 30 may similarly be assigned with an ATM address for the associated ATM switch. The serving MSC 30 may also be assigned with a network independent address or identification data, such as global positioning system (GPS) coordinates. Accordingly, a plurality of different network addresses may be associated with the same physical telecommunications node supporting the relevant network protocols and standards or with the same subscriber location.

Reference is again made to FIG. 5. As a further embodiment of the present invention, the centralized administrative node (main SMCF) 260 is further subdivided into two basic sub-functions or modules. A service profile and definition (SPD) function 340 defines a new subscriber service profile to represent a new subscriber or device. Similarly, changes or updates to existing subscriber profiles or network data are made via the SPD 340. The changes are then updated with the subscriber access sub-database 300 and the subscriber profile sub-database 310. Accordingly, in order for a subscriber to subscribe and to obtain a new network address with an PLMN, ATM, and IP networks, instead of individually contacting and subscribing to a number of different networks, the SPD 340 within the main SMCF 260 collects the information and creates a network independent profile and subscription and communicates such data to the centralized database SDLA 250 and its sub-databases 300 and 310 via the interface 290. The main SDLA 250 and its associated sub-databases then determine which network should be informed of the new subscriber or device and accordingly down-load the relevant data to each affected network via the interfaces 270. Similarly, the main SMCF 260 may also communicate with each network via the interfaces 280.

The main SMCF 260 further includes an enhanced service control function (SCF) 330. It is desirable to effectuate service interaction between various networks for subscribers that have adequate terminal, profile, and Intelligent Network (IN) capabilities to access different types of networks. The intelligence or control for such interaction is realized by the SCF 330 of the main SMCF 260. Therefore, the SCF 330 coordinates with the SMCF 200 within each associated communications network 10 via interfaces 280 to enable data to be communicated between a first service within a first network and a second service within a second network. As an illustration, an incoming fax transmission is received towards a particular subscriber within a Public Switched Telephone Network (PSTN). The subscriber is currently associated with a mobile station and wishes to receive the fax via his or her e-mail capability over the associated IP network. Accordingly, the SCF 330 coordinates with a bearer service within the PLMN network to interface and to transport the fax data with the IP network and to deliver the fax-message to the called party mobile station over an associated PLMN. While interfacing the first service with the second service, additional formatting and parameter adjustments may also be performed by the SCF 330.

Figure 6:
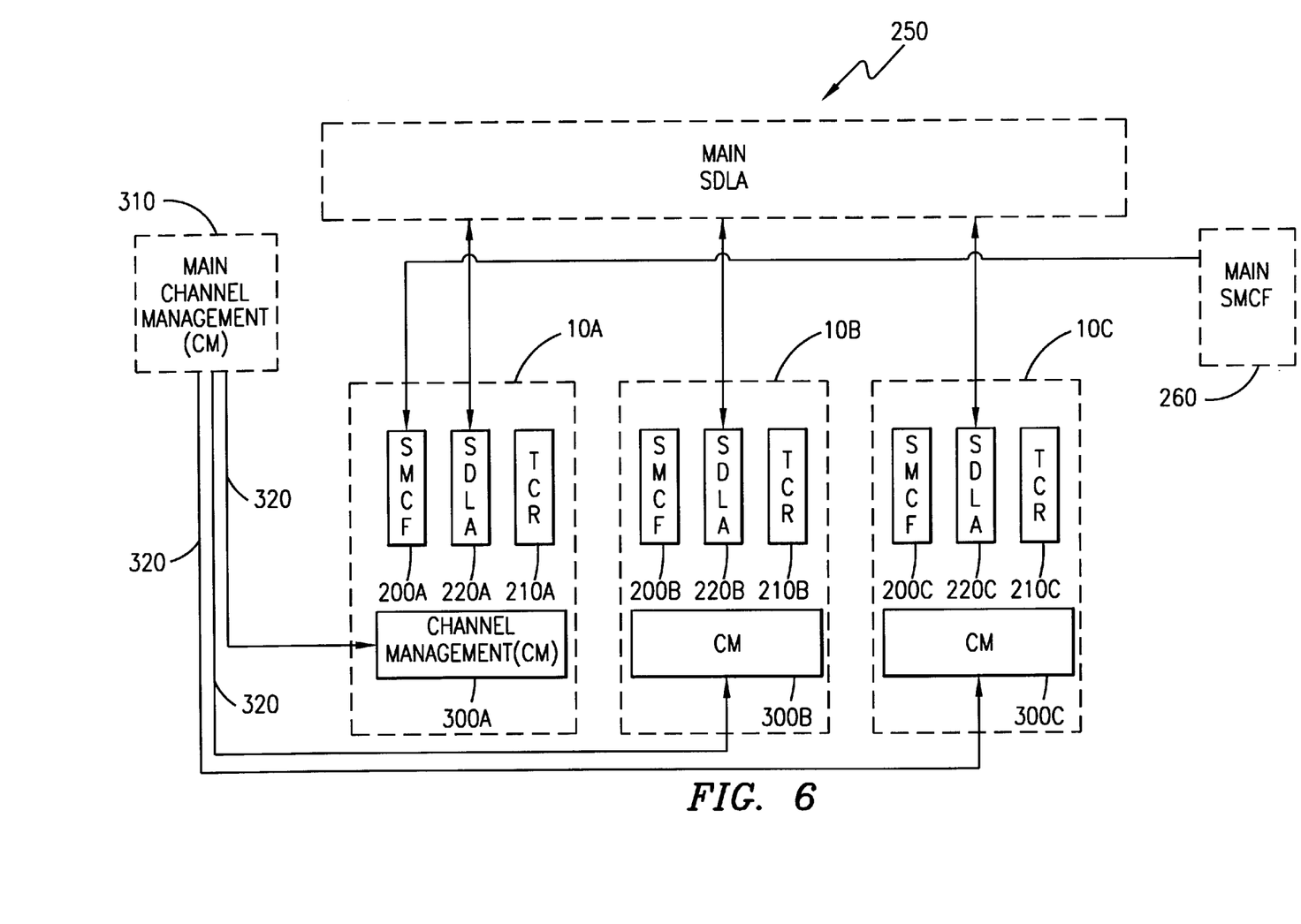
FIG. 6 is a diagram illustrating the logical interfaces that exist between a main resource management module and each communications network.

Reference is now made to FIG. 6 illustrating the logical interfaces that exist between a main resource management module and each communications network. Further included within each communications network is a channel management (CM) or resource management function 300. The CM function 300 within each network manages and controls available network resources. In case a first channel management function 300A within a first communications network 10A and a second channel management function 300B within a second communications network 1OB utilize or share common network resources, a collision or resource dead-lock could occur. As an illustration, a CDPD network is a cellular radio network specification that allows CDPD users to send computer data over existing cellular (including Advanced Mobile Phone system—AMPS, or Digital Advanced Mobile Phone System—DAMPS) or PLMN networks. Consequently, some of the network resources are shared by the cellular network and the CDPD network. A main system or network then needs to reconcile or control access to various physical devices or resources shared by more than one communications network. This can be referred to as network convergence. In accordance with the teachings of the present invention, a main channel or resource management (CM) 310 is further provided within the overall system. The main CM 310 then allocates, controls, and reconciles the utilization of shared network resources between the local CMs 300A–300C associated with each communications network 10A–10C via interfaces 320.

Figure 7:
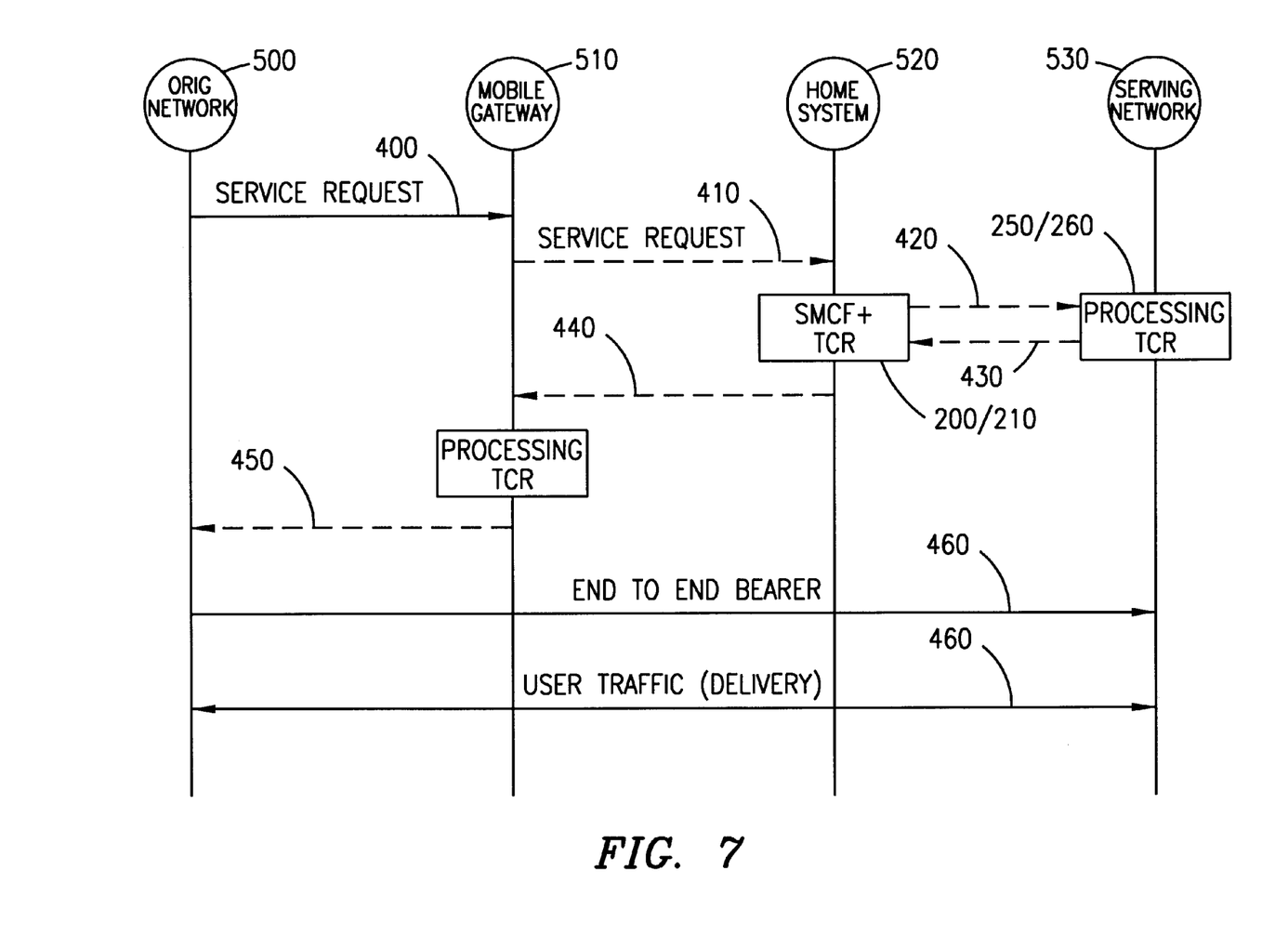
FIG. 7 is a signal sequence chart illustrating a typical routing strategy in accordance with the teachings of the present invention.

FIG. 7 is a signal sequence chart illustrating a typical routing strategy in accordance with the teachings of the present invention. The illustrated routing and delivery strategy is based on the "service request" transmitted from an originating network serving an originating subscriber or device. The originating network may be a mobile based network or a fixed network. The service request from the originating physical network may either be routed through a connection oriented bearer (e.g., circuit connection) or connection-less bearer (e.g., IP packet connection).

Typically the service request 400 originated by the originating network 500 is routed to a mobile gateway compatible 510 with the originating network's access bearer or function. As an illustration, within a PLMN, the gateway MSC (refer to FIG. 1, GMSC 100) functions as a mobile gateway 510. The gateway 510 then performs the task of routing the service request to the destined subscriber or device. Within the gateway 510, the destination or called party subscriber is identified to ascertain an associated home system 520. The physical network address may be used to identity the subscriber, or it may further be a network termination equipment address. In both cases, addresses such as ATM, FrameRelay, ISDN, directory number, MSISDN, MIN, IP, IMSI are utilized. The subscriber address within the service request signal is then deduced by the gateway 510 and appropriate TCR network specific functions. As an illustration, a home location register (HLR) associated with a specified MSISDN number, IMSI, or MIN is determined by the GMSC as the home system for a particular mobile station.

Once the subscriber's home system 520 has been identified, such as an HLR, the gateway 500 transmits another service request 410 toward the identified home system 520. The home system then determines how the requested connection can be fulfilled or realized. The local SMCF 200 and TCR 210 then determine the routing parameters and requirements needed as input to the associated TCR functions to deliver and to route the received service request. This is performed by analyzing the requested service in the main SDLA and SMCF (not shown in FIG. 7, refer to FIG. 6) with respect to the previously defined service parameters, service preferences, and the current location and registration status of the subscriber in a particular network. For example, the local network's SMCF 200 invokes the main SMCF. The main SMCF may further invoke and access the main SDLA database. The main SDLA database may access other local network's SDLA database(s), if necessary, to acquire the necessary data. Utilizing such data, specific routing procedures may be initiated towards the visited system via interfaces 420 and 430.

As a result, the routing of the service to the serving network 530 where the subscriber is located is effectuated (sequence 440 and 450). An end to end connection is negotiated 460 and user traffic or data are then communicated therebetween.

Figure 8:
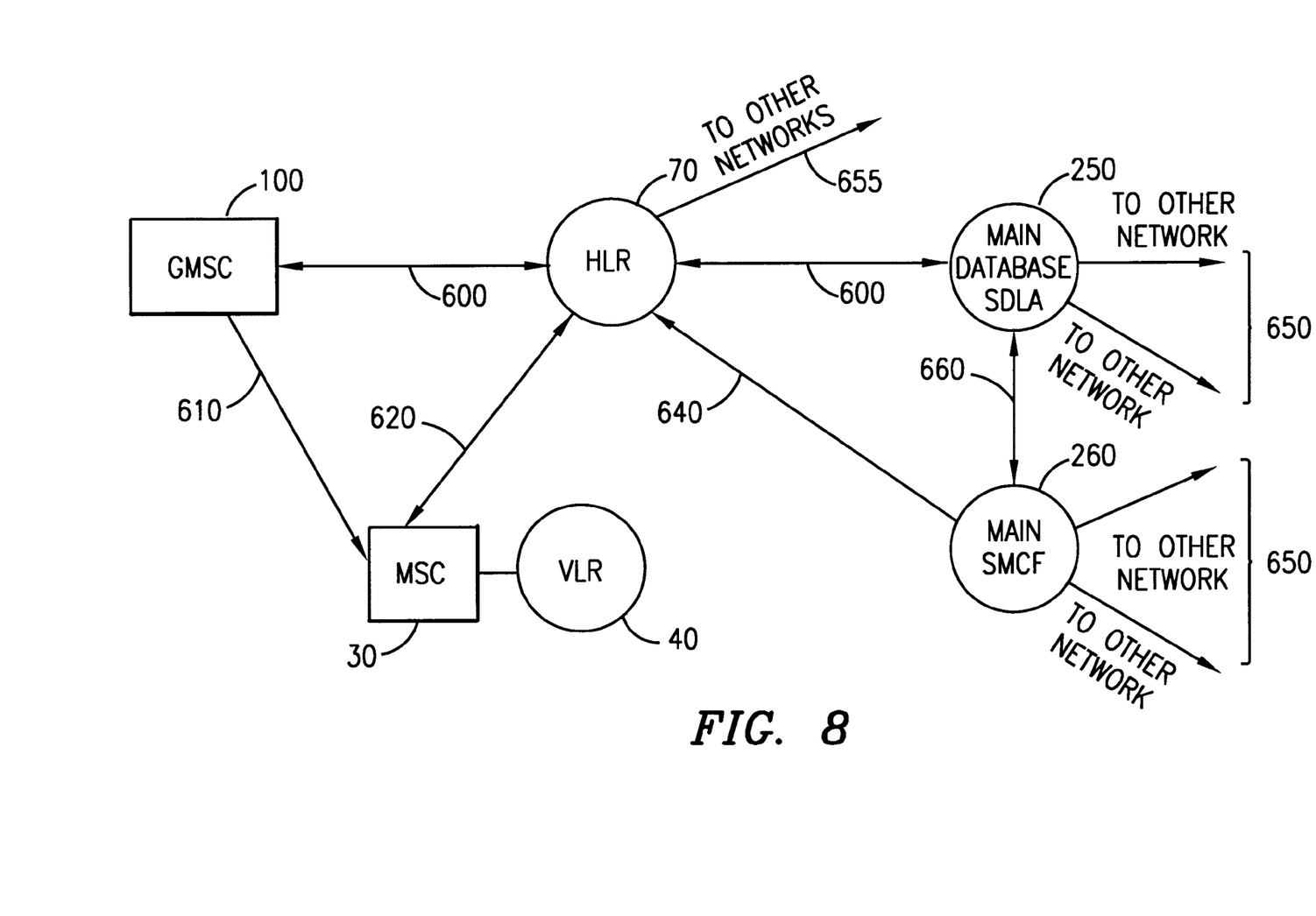
FIG. 8 is a block diagram illustrating the network configuration of an PLMN in accordance with the teachings of the present invention.

FIG. 8 is a block diagram illustrating the network configuration of an PLMN in accordance with the teachings of the present invention. As fully described in FIG. 7, the GMSC 100 serves as a gateway within an PLMN system. Each mobile subscriber is associated with a particular home location register (HLR). Typically, the subscriber is assigned with a MSISDN number, MIN, and/or IMSI number from a series of numbers pre-allocated to the HLR 70. Accordingly, the HLR 70 stores and maintains subscription data, service data, location data and registration data associated with a particular subscriber. While the user is located within a particular geographic area, another database known as the visitor location register (VLR) maintains and keeps track of the subscriber while the subscriber remains within that coverage area. Referring back to FIG. 3, physical telecommunications nodes, such as the HLR 70 and the VLR 40, then perform the logical functions illustrated by the logical SMCF 200 and SDLA 220. Furthermore, by analyzing an MSISDN number, MIN, or IMSI number specified within a service request signal, such as an ISUP Initial Address Message (IAM) signal, the GMSC 100 is able to ascertain which HLR is serving the provided identification number. Accordingly, the GMSC 100 is able to forward the service request via an interface 600 toward the associated HLR 70.

The HLR 70 then further communicates with the MSC/VLR 30/40 via an interface 620 to ascertain how to effectuate a call connection. The parameters and routing instructions, such as a roaming number or TLDN representing the serving MSC/VLR, are returned to the requesting GMSC 100. As a result, an interface 610 between the GMSC 100 and the serving network or MSC/VLR 30/40 is effectuated. The serving HLR 70 similarly communicates with other compatible networks via an interface 655.

As described above, the HLR 70 functioning as the local SMCF and SDLA further communicates with the centralized database 250 functioning as the main SDLA. Such communication enables data to be shared between the main SDLA and the local SDLA and SMCF. Such shared data include the current location of a particular mobile station within a PLMN. The main SDLA database 250 then shares such information with other associated networks via interfaces 650. Such interaction or interface enables other types of communications networks to interwork or to cross-network communication therebetween. Furthermore, in order to provide a concentrated or consolidated view of all network information associated with a particular subscriber, the main SMCF 260 is further able to communicate with the local HLR 70 via an interface 650 and with the main SDLA 250 via an interface 660. It is to be understood that for exemplary purposes, the main SDLA 250 and the main SMCF 260 are illustrated using two separate nodes. However, the two functions may well be co-located within a single node and supported by a common platform.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for providing mobility management and control over subscription and service data for a plurality of communications networks, each communications network including a function for providing management of service and subscription data, a function for maintaining subscriber data, location, and activity, and a function for providing traffic control and routing of service, wherein all three functions within each network are network dependent and specific and are not compatible with corresponding functions within another network, said system comprising:

a main database maintaining data representative of subscriber data, location, and activity within each of said plurality of communications networks, said main database communicating said data with said function for maintaining subscriber data, location, and activity within each of said plurality of communications network; and a main service management and control function (SMCF) module managing and controlling service and subscription data, said main SMCF module communicating with said function for providing management of service and subscription data within each of said plurality of communications networks, said function being a SMCF function local to each of said networks, and with said main database.

2. The system of claim 1 wherein said main database further comprises:

a first sub-database for maintaining a plurality of network addresses each representing a particular subscriber within each of said plurality of communications networks;

a second sub-database for maintaining subscriber profile data representing said mobile subscriber, a portion of said subscriber profile data representing said subscriber within each of said plurality of communications networks; and a third sub-database for maintaining location and registration data representing said subscriber with respect to each of said plurality of communications networks.

3. The system of claim 2 wherein said network addresses are selected from the group consisting of:

Mobile Subscriber Integrated Service Digital Network (MSISDN) number;

International Mobile Subscriber Identity (IMSI) number;

Asynchronous Transfer Mode (ATM) address;

Internet Protocol (IP) address;

E.164 directory number; and

E-mail address.

4. The system of claim 1 wherein said main SMCF module further comprises:

a service and profile definition module for defining new subscription for a particular user and communicating said subscription to said main database; and an enhanced service control function module for enabling data to be communicated between a first communications network and a second communications network.

5. The system of claim 4 wherein said main SMCF and said main database further comprises means for receiving and storing said data from each of said plurality of communications networks.

6. The system of claim 4 wherein said enhanced service control function module further enables a first service within said first communications network to interface with a second service within said second communications network.

7. The system of claim 1 wherein each of said plurality of communications networks further comprises a channel management (CM) for managing associated hardware resources and wherein some of said plurality of communications networks share common resources for effectuating communication therein, said system further comprising a main channel management (CM) module for allocating and managing said shared resources amongst said some of said plurality of communications networks.

8. The system of claim 1 wherein said main database further comprises:

means for receiving data representing a current location of a particular subscriber within a first communications network; and means for communicating said data with a second communications network in a readable format.

9. A communications system, comprising:

a first communications network including a first register for storing and maintaining a current location of a particular subscriber within said first communications network, said subscriber identified by a first network address within said first communications network;

a second communications network including a second register for storing and maintaining a current location of said subscriber within said second communications network, said subscriber identified by a second network address within said second communications network;

a main database for storing said first network address and said second network address associated with said subscriber, said main database further keeping track of said current location of said subscriber within said first and second communications networks; and a main administration node for defining new subscription data for a second subscriber and communicating said new subscription data with local service management and control functions (SMCF) of said first and second communications networks and said main database.

10. The system of claim 9 further comprising:
a third register within said first communications network for storing first subscription data associated with said subscriber;
a fourth register within said second communications network for storing second subscription data associated with said subscriber; and
wherein said main database further stores said first subscription data and said second subscription data associated with said first and second communications networks.

11. The system of claim 9 wherein said first communications network provides a first service toward said subscriber and said second communications network provides a second service for said subscriber, wherein said main administration node further comprises a service control module for enabling said first service to interface with said second service.

12. The system of claim 9 wherein said first communications network utilizes particular network resources and said second communications network also utilizes said network resources, and said system further comprising a main resource management module for allocating and managing said network resources between said first and second communications networks.

13. The system of claim 9 wherein said first communications network comprises a cellular telecommunications network and said first network address comprises a mobile identification number representing said subscriber.

14. The system of claim 9 wherein said second communications network comprises a Internet Protocol (IP) network and said second network address comprises an Internet Protocol (IP) address associated with said subscriber.

15. The system of claim 9 wherein said main database further comprises an application module for receiving data representing said location of said subscriber within said first communications network from said first register and communicating said received data with said second register within said second communications network.

16. A communications system, comprising:
a first communications network comprising:
a first service management and control (SMC) module for maintaining subscription data associated with a particular subscriber and service data associated with a first service provided within said first communications network; and
a first subscriber location and registration (SLR) module for maintaining location and registration data associated with said subscriber;
a second communications network comprising:
a second SMC module for maintaining subscription data associated with said subscriber and service data associated with a second service provided within said second communications network; and
a second SLR module for maintaining location and registration data associated with said subscriber;
a main centralized database for storing data representing said location of said subscriber within each of said first and second communications networks;
a main administrative module for defining and providing new subscription data representing a second subscriber;
a first communications interface for connecting said main centralized database with said first SLR and said second SLR; and
a second communications interface for connecting said main administrative module with said first SMC and said second SMC.

17. The system of claim 16 wherein said main centralized database further comprises a subscriber address sub-database for storing and correlating a first network address representing said subscriber within said first communications network with a second network address representing said subscriber within said second communications network.

18. The system of claim 16 wherein said main centralized database further comprises a subscriber profile sub-database for storing and correlating a first subscription associated with said subscriber within said first communications network with a second subscription associated with said subscriber within said second communications network.

19. The system of claim 18 further comprising a third communications interface for connecting said main centralized database with said administrative module.

20. The system of claim 18 further comprises:
network resources wherein said first communications network and said second communications network share said network resources; and
a main resource management module for allocating and managing said network resources between said first and said second communications networks.

21. The system of claim 18 where said main administrative module further comprises a service control function for enabling said first service within said first communications network to interface with said second service within said second communications network.

* * * * *